(12) United States Patent
Gruzdev

(10) Patent No.: US 10,061,381 B2
(45) Date of Patent: Aug. 28, 2018

(54) DEVICE FOR CONTROLLING A MOTION SYSTEM

(71) Applicant: Andrey Valerievich Gruzdev, Voronezh (RU)

(72) Inventor: Andrey Valerievich Gruzdev, Voronezh (RU)

(73) Assignees: Andrey Valerievich Gruzdev, Voronezh (RU); Evgenil Perevozchikov, Voronezh (RU)

( * ) Notice: Subject to any disclaimer, the term of this patent is extended or adjusted under 35 U.S.C. 154(b) by 45 days.

(21) Appl. No.: 15/323,234

(22) PCT Filed: Jun. 15, 2015

(86) PCT No.: PCT/RU2015/000370
§ 371 (c)(1),
(2) Date: Dec. 30, 2016

(87) PCT Pub. No.: WO2016/003318
PCT Pub. Date: Jan. 7, 2016

(65) Prior Publication Data
US 2017/0131761 A1 May 11, 2017

(30) Foreign Application Priority Data
Jul. 1, 2014 (RU) ................................ 2014126703

(51) Int. Cl.
G06F 3/0362 (2013.01)
G06F 3/0346 (2013.01)
(Continued)

(52) U.S. Cl.
CPC .............. *G06F 3/011* (2013.01); *A63F 13/24* (2014.09); *G05B 15/02* (2013.01); *G05G 1/00* (2013.01); *G06F 3/02* (2013.01); *G06F 3/0362* (2013.01)

(58) Field of Classification Search
None
See application file for complete search history.

(56) References Cited

U.S. PATENT DOCUMENTS 5,122,786 A * 6/1992 Rader ........................ B41J 5/10
248/917
9,275,504 B1 * 3/2016 Cooper ................ G07C 5/0816
(Continued)

FOREIGN PATENT DOCUMENTS

RU 2344465 C1 1/2009
WO 2006082584 A2 8/2006

*Primary Examiner* — William Lu
(74) *Attorney, Agent, or Firm* — Nadya Reingand; Yan Hankin

(57) ABSTRACT

This invention relates to computer technology, and more particularly to input devices, and can be used in computer games, for controlling objects in spaces simulated on an electronic computer, and is intended to provide more reliable and accurate control of a motion system by means of a device, comprising buttons, and a body having a pivot with a stem which is rigidly connected to an operator's seat by an arm with clamps. The body is rigidly connected to a control element in the form of an H-shaped frame with clamps and with curved supporting surfaces for the forearms of the operator, said control element being capable of movement by virtue of the pivot, the rigidity of movement of which can be adjusted with the aid of a regulator, disposed inside the body; buttons, pivoting buttons, multi-contact buttons and rollers are situated on the front parts of the control element, opposite one another along the side edges of said front parts.

1 Claim, 1 Drawing Sheet

(51) Int. Cl.
*G06F 3/01* (2006.01)
*G05G 1/00* (2006.01)
*G06F 3/02* (2006.01)
*A63F 13/24* (2014.01)
*G05B 15/02* (2006.01)

(56) References Cited

U.S. PATENT DOCUMENTS

| | | | | |
|---|---|---|---|---|
| 2001/0052893 | A1* | 12/2001 | Jolly | B62D 5/006 |
| | | | | 345/156 |
| 2008/0208396 | A1* | 8/2008 | Cairola | G06F 3/011 |
| | | | | 701/3 |
| 2009/0316420 | A1* | 12/2009 | Villecco | F21L 14/02 |
| | | | | 362/396 |
| 2010/0000369 | A1* | 1/2010 | Cote | B62K 21/125 |
| | | | | 74/551.8 |
| 2010/0206124 | A1* | 8/2010 | Ferrusi | B62K 21/125 |
| | | | | 74/551.8 |
| 2011/0152881 | A1* | 6/2011 | Conner | A61B 34/30 |
| | | | | 606/130 |
| 2012/0020790 | A1* | 1/2012 | Burgess, Jr. | A63C 17/0013 |
| | | | | 416/63 |
| 2012/0047648 | A1* | 3/2012 | Purwar | A61G 7/1017 |
| | | | | 5/86.1 |
| 2015/0103007 | A1* | 4/2015 | Forshaug | G06F 3/0233 |
| | | | | 345/163 |
| 2016/0304180 | A1* | 10/2016 | Steven | B63H 25/02 |
| 2017/0008598 | A1* | 1/2017 | Brown | B62K 21/16 |

* cited by examiner

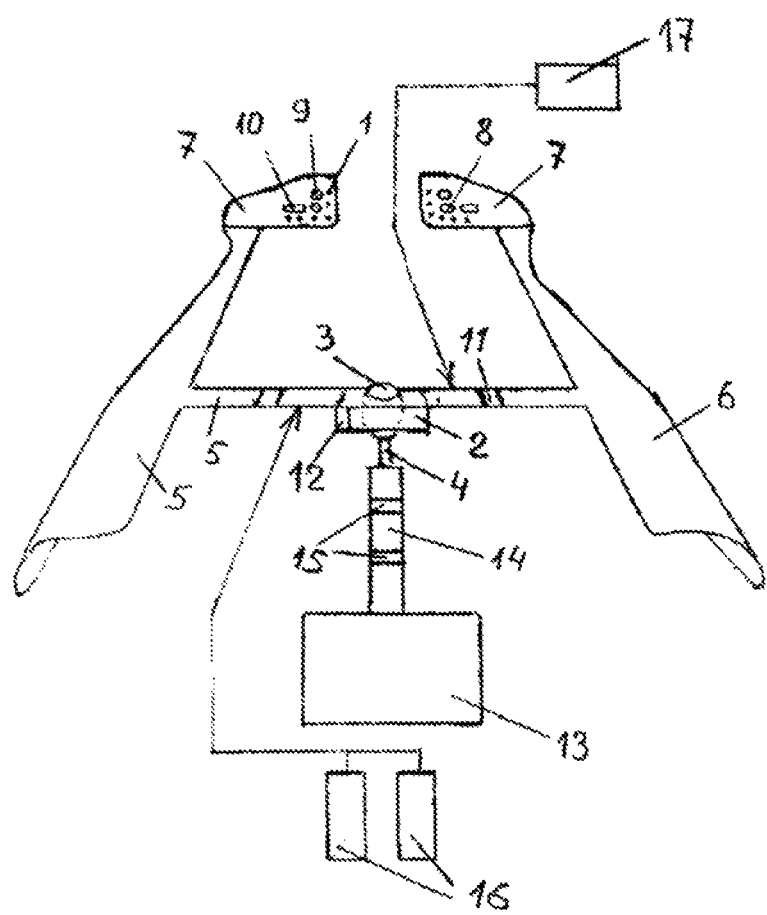

DEVICE FOR CONTROLLING A MOTION SYSTEM

CROSS-REFERENCE TO RELATED APPLICATIONS

This patent application is a National stage application for PCT application PCT/RU2015/000370 filed Jun. 15, 2015, which claims priority to Russian patent application RU 2014126703 filed Jul. 1, 2014, all of which incorporated herein by reference.

FIELD OF INVENTION

The invention refers to the computer engineering, particularly to the input devices, and may be used in computer games, for controlling objects in computer-simulated spaces, in the sphere of machine-building, airplane-building and cosmonautics.

BACKGROUND

Known is a description of control system Razer Orbweaver, applicant firm Razer, in the person of General Director Min-Lyan Tan, and President Robert "Razerguy" Krakoff, consisting of a support surface with a group of buttons and rollers on it.
Disadvantages: insufficiently high reliability and accuracy of motion system control.
The analog does not allow controlling the motion system without involving additional controls, absence of submersion into the computer-simulated space.
Known is a description of control system Kinect, applicant—Microsoft Corporation. An attachment with motion sensors tracing the operator's position in space.
Disadvantages: low accuracy of motions, low reliability indices in "Man-Machine" system.
Known is the closest analog in the description of invention's patent—manipulator for computer No 2344465, MIIK G06F3/00, dated 16 Apr. 2007, published 20 Jan. 2009, containing buttons, body, rigidly connected with a controlling element, executed in the form of an H-shaped frame with curvilinear support surfaces, on the front parts of which, along the periphery, opposite each other, on the lateral sides are located buttons and rollers for convenient motion system control, inside a hinge is installed on which a tail is rigidly fixed, and on the controlling element, executed in the form of an H-shaped frame, between the curvilinear support surfaces are installed clamps, and inside the body is located a regulator that controls the rigidity of the hinge's motion.
Disadvantages: insufficient accuracy of motions, low index of reliability in the system. The tail has no rigid connection with the operator's seat, absence of precise adjustment of height of the controlling element and precise adjustment of the distance between the operator and the controlling element, as well as absence of controlling elements for the operator's feet and motion sensors tracing the position of the operator's head, hands and shoulders.

SUMMARY

Technical result: increased reliability and accuracy of the motion system control.
The increased reliability and accuracy of the motion system control in the motion system control device, containing buttons, body, rigidly connected with the controlling element, executed in the form of an H-shaped frame with curvilinear support surfaces, on the front parts of which, along the periphery, opposite each other, on the lateral sides are located buttons and rollers for convenient motion system control, inside a hinge is installed on which a tail is rigidly fixed, and on the controlling element, executed in the form of an H-shaped frame, between the curvilinear support surfaces are installed clamps, and inside the body is located a regulator that controls the rigidity of the hinge's motion, is achieved because into the motion system control device are additionally introduced pedals and motion sensors, connected with the controlling element by wires or wireless communication, and the tail is rigidly connected with a mounting bracket that has adjusting clamps.
The additionally introduced pedals and motion sensors, connected with the controlling element by wires or wireless communication, allow transferring a part of the controlled functions to the operator's feet and trace the position of the operator's head, hands and shoulders in space.
The technical result is achieved due to the possibility to adjust the height of the controlling element and the distance to the operator with the help of the bracket with clamps, which rigidly connects the tail with the operator's seat, since the operator can maximally precisely select the supporting point of the support of the controlling element, rigidly fix its position, and in operation there appear no impeding control fluctuations between the supporting point of the controlling element and the operator's seat, due to equipping the control device with pedals, and since the control over a part of the functions in the systems is transferred to the feet, the operator deeper submerges into the computer-simulated space, which makes control more intuitive, simplifying movement in the computer-simulated space due to the fact that the part of the control functions transferred to the feet decreases the load on the operator's fingers, he becomes less tired, which increases the duration of his reliable and accurate operation, due to equipping the device with the motion sensors that control the position of the operator's head, hands and shoulders, since the operator obtains additional functions that create new opportunities in the motion system, which allows achieving a more accurate result when controlling.
The carried out analysis of the prior art revealed that the claimed combination of essential features listed in the claims is unknown. It is established that the claimed technical solution is not obvious from the prior art. The invention is novel, it has an inventive step and is industrially applicable.

BRIEF DESCRIPTION OF THE DRAWING

The motion system control device is illustrated in the drawing.
The FIG. 1 shows the general view of the device.

DETAILED DESCRIPTION OF THE PREFERRED EMBODIMENT

The motion system control device (FIG. 1) comprises buttons 1, body 2, inside body 2 is installed a hinge 3, on which is rigidly fixed a tail 4, rigidly connected with the operator's seat 13, bracket 14 with clamps 15, and body 2 is rigidly connected with a controlling element 5, executed in the form of an H-shaped frame with curvilinear support surfaces 6 for positioning of the operator's forearms with a possibility to move due to the hinge 3, whose rigidity of motion can be adjusted with the help of located in body 2 regulator 12 at the operator's option or automatically, depending on the situation in the motion system, and at the front parts 7 of the controlling element 5 along the periphery, opposite each other, on the lateral sides, are located buttons 1, hinge buttons 8, multicontact buttons 9, rollers 10 for reliable and accurate control of the motion system, and the controlling element 5 has a possibility of adjusting the H-shaped frame due to located on it clamps 11 across the width between the curvilinear support surfaces 6. The motion system control device is equipped with pedals 16 and motion sensors 17, connected with the controlling element 5 with wires or wireless communication.

Device Operation.

The motion system control device operates as follows. The operator, by means of bracket 14 with clamps 15, maximally precisely selects the supporting point of controlling element 5, rigidly fixes in it tale 4, rigidly connected with hinge 3. The operator sits on the seat 13 in front of body 2, the forearms are positioned upon the controlling element 5, executed in the form of an H-shaped frame with curvilinear supporting surfaces 6 for positioning of the operator's forearms with a possibility of movement due to hinge 3, rigidly connected with seat 13 by means of tail 4 and bracket 14 with clamps 15. The operator sets an exact for himself width of the controlling element 5 with the help of clamps 11. The controlling element 5 is rigidly connected with body 2, where hinge 3 is located, due to which the controlling element 5 can move, and in the body 2 is installed regulator 12 that controls the rigidity of motion of hinge 3, and the operator, prior to operation, sets the desired level of rigidity of motion of hinge 3 with the help of regulator 12. The motion system is partly controlled by the operator's forearms, resting on the curvilinear support surfaces 6, is partly controlled by the operator's hands, resting on the front parts 7 of the controlling element 5, is partly controlled by the operator's feet by means of pedals 16, is partly controlled by the movements of the operator's head, hands and shoulders, by means of motion sensors 17. Since regulator 12 located inside body 2 during the manipulator's operation automatically controls the rigidity of motion of hinge 3 in body 2 depending on the situation in the motion system, the operator obtains a "feedback" effect and a clearer perception of the motion system. Since a part of the motion system is controlled by the operator's feet by means of pedals 16, the operator deeper submerges into the computer-simulated space, the operator obtains the effect of "being present inside" the computer-simulated space. Since a part of the motion system is controlled by the movements of the operator's head, hands and shoulders by means of motion sensors 17, the operator obtains new functions in the motion system. The operator's hands interact with buttons 1, hinge buttons 8, multicontact buttons 9 and rollers 10, located at the front parts 7 of the controlling element 5 along the periphery, opposite each other, on the lateral sides for precise motion system control.

EXAMPLE 1

The operator, by means of bracket 14 with clamps 15, maximally precisely selects the supporting point of controlling element 5, rigidly fixes in it tale 4, rigidly connected with hinge 3. The operator sits on the seat 13 in front of body 2, the forearms are positioned upon the controlling element 5, executed in the form of an H-shaped frame with curvilinear supporting surfaces 6 for positioning of the operator's forearms with a possibility of movement due to hinge 3, rigidly connected with seat 13 by means of tail 4 and bracket 14 with clamps 15. The operator sets an exact for himself width of the controlling element 5 with the help of clamps 11. The controlling element 5 is rigidly connected with body 2, where hinge 3 is located, due to which the controlling element 5 can move, and in the body 2 is installed regulator 12 that controls the rigidity of motion of hinge 3, and the operator, prior to operation, sets the desired level of rigidity of motion of hinge 3 with the help of regulator 12. The motion system is partly controlled by the operator's forearms, resting on the curvilinear support surfaces 6, is partly controlled by the operator's hands, resting on the front parts 7 of the controlling element 5, is partly controlled by the operator's feet by means of pedals 16, is partly controlled by the movements of the operator's head, hands and shoulders, by means of motion sensors 17. Since regulator 12 located inside body 2 during the manipulator's operation automatically controls the rigidity of motion of hinge 3 in body 2 depending on the situation in the motion system, the operator obtains a "feedback" effect and a clearer perception of the motion system. Since a part of the motion system is controlled by the operator's feet by means of pedals 16, the operator deeper submerges into the computer-simulated space, the operator obtains the effect of "being present inside" the computer-simulated space. By the feet, using pedals 16, the operator controls the feet-related functions such as "walk and run, forward-backward" or moved a transport "forward-backward". Since a part of the motion system is controlled by the movements of the operator's head, hands and shoulders by means of motion sensors 17, the operator obtains new functions in the motion system. One of the new functions in the motion system is the possibility to "look around the corner" without moving the body of the controlled unit; the operator deviates himself, while motion sensors 17 that control the position of head, hands and shoulders, create this effect in the computer-simulated space. The operator's hands interact with buttons 1, hinge buttons 8, multicontact buttons 9 and rollers 10, located at the front parts 7 of the controlling element 5 along the periphery, opposite each other, on the lateral sides of the front part 7 for reliable and precise motion system control. The use of the motion control system device will allow increasing the reliability and accuracy of the motion system control.

What is claimed is:

1. A motion system control device, comprising:
    a body, said body being rigidly connected to a controlling element, the controlling element comprising a continuous H-shaped frame, the H-shaped frame having curvilinear support surfaces for a user's forearms, wherein the H-shaped frame comprises a first set of clamps for adjusting a width of the H-shaped frame,
    buttons and rollers being located on a front part of each side of the H-shaped frame,
    a circular hinge, said hinge being located at the center of the H-shaped frame, said controlling element pivoting as a whole about said circular hinge thus directing a cursor on a screen, wherein a rigidity of a motion of said hinge is controlled automatically by a regulator based on a motion system situation, said regulator being installed in the body,
    a tail, said tail being rigidly connected to said hinge at a bottom portion of said hinge, said tail being further connected to a first end of a mounting bracket, an opposite end of said mounting bracket being further connected to a seat, wherein said mounting bracket comprises a second set of clamps for adjusting a height of the H-shaped frame, pedals, said pedals being connected to the controlling element, and motion sensors, said motion sensors being connected to the controlling element, said motion sensors sensing movements of the user's head, hands, and shoulders without moving the body or the controlling element.

\* \* \* \* \*

UNITED STATES PATENT AND TRADEMARK OFFICE
CERTIFICATE OF CORRECTION

PATENT NO. : 10,061,381 B2
APPLICATION NO. : 15/323234
DATED : August 28, 2018
INVENTOR(S) : Andrey Valerievich Gruzdev It is certified that error appears in the above-identified patent and that said Letters Patent is hereby corrected as shown below:

On the Title Page

Item (73) should read:
Assignees: Andrey Valerievich GRUZDEV, Voronezh (RU); Evgenii PEREVOZCHIKOV, Voronezh (RU)

Signed and Sealed this
Thirtieth Day of April, 2019

Andrei Iancu
*Director of the United States Patent and Trademark Office*